United States Patent
Kitagawa et al.

(10) Patent No.: US 7,872,783 B2
(45) Date of Patent: Jan. 18, 2011

(54) IMAGE READING APPARATUS

(75) Inventors: Yasuhiko Kitagawa, Ishikawa (JP); Yusuke Nakashima, Ishikawa (JP)

(73) Assignee: PFU Limited, Ishikawa (JP)

( * ) Notice: Subject to any disclaimer, the term of this patent is extended or adjusted under 35 U.S.C. 154(b) by 340 days.

(21) Appl. No.: 12/038,679

(22) Filed: Feb. 27, 2008

(65) Prior Publication Data

US 2008/0259414 A1    Oct. 23, 2008

(30) Foreign Application Priority Data

Apr. 17, 2007   (JP)   ............................. 2007-108171

(51) Int. Cl.
*H04N 1/04*   (2006.01)
(52) U.S. Cl. ................. 358/498; 358/496; 358/474; 358/408; 399/364; 399/377
(58) Field of Classification Search ................ 358/496, 358/498, 474, 408; 399/367, 371, 377, 364; 355/23, 24
See application file for complete search history.

(56) References Cited

U.S. PATENT DOCUMENTS

| | | | | |
|---|---|---|---|---|
| 5,157,521 A | * | 10/1992 | Chung | ........................ 358/498 |
| 5,513,017 A | * | 4/1996 | Knodt et al. | ................. 358/471 |
| 5,761,599 A | * | 6/1998 | Weng et al. | .................. 399/367 |
| 6,025,936 A | * | 2/2000 | Ishida | .......................... 358/498 |
| 6,665,098 B1 | * | 12/2003 | Nagarajan | .................... 358/474 |
| 7,450,277 B2 | * | 11/2008 | Poletto | ......................... 358/498 |

FOREIGN PATENT DOCUMENTS

| | | |
|---|---|---|
| JP | 09-284478 A | 10/1997 |
| JP | 2000-151912 A | 5/2000 |

* cited by examiner

*Primary Examiner*—Cheukfan Lee
(74) *Attorney, Agent, or Firm*—Lowe, Hauptman, Ham & Berner, LLP

(57) ABSTRACT

An image reading apparatus includes a feeding unit, a conveying unit, a primary stacking unit, a secondary stacking unit, and a path switching unit. The path switching unit switches between a first conveying path including a bend section for normal conveying mode and a second conveying path for reverse conveying mode. In the normal conveying mode, the conveying unit conveys a sheet fed from the feeding unit to the primary stacking unit through the first conveying path. In the reverse conveying mode, the conveying unit conveys a sheet fed from the primary stacking unit to the secondary stacking unit through the second conveying path bypassing the bend section.

6 Claims, 6 Drawing Sheets

IMAGE READING APPARATUS

RELATED APPLICATIONS

The present application is based on, and claims priority from, Japan Application Number 2007-108171, filed Apr. 17, 2007, the disclosure of which is hereby incorporated by reference herein in its entirety.

BACKGROUND OF THE INVENTION

1. Field of the Invention

The present invention relates to an image reading apparatus.

2. Description of the Related Art

Among conventional image reading apparatuses is an auto-document-feeder type image reading apparatus (hereinafter, "ADF image-reading apparatus") that can successively read images from sheet-type media (hereinafter, "sheets") stacked thereon. That is, such an ADF image-reading apparatus can automatically and successively feed a large number of sheets having a predetermined size for reading images therefrom.

Japanese Patent Application Laid-open No. H9-284478 discloses a conventional ADF image-reading apparatus. The conventional ADF image-reading apparatus includes an automatic feeding unit arranged on one side of the conveying unit, and a manual feeding unit arranged on another side of the conveying unit. The conveying unit conveys sheets from the automatic feeding unit and the manual feeding unit to an image reading unit. The conventional ADF-image reading apparatus switches the direction in which a sheet is conveyed (conveying direction) between a normal conveying direction and a reverse conveying direction. The automatic feeding unit automatically separates one sheet at a time from the sheets stacked thereon and feed the separated sheet to the conveying unit. On the other hand, sheets not separable in the automatic feeding unit (e.g., thin paper sheets or overhead projector (OHP) films) can be manually fed one by one from the manual feeding unit. More particularly, in a normal conveying mode, a sheet automatically fed from the automatic feeding unit is discharged to the manual feeding unit. Thus, in this case, the manual feeding unit functions as a stacking unit. On the other hand, in a reverse conveying mode, a sheet manually fed from the manual feeding unit is discharged to the automatic feeding unit. Thus, in this case, the automatic feeding unit functions as a stacking unit.

To achieve a compact structure, the conventional ADF image-reading apparatus includes a bend section in a conveying path between the automatic feeding unit and the manual feeding unit. However, when, e.g., a comparatively thin and easily bendable sheet is fed from the manual feeding unit, it is likely that the sheet gets bent or damaged at the bend section thereby causing jams in the conveying path. Moreover, when, e.g., a comparatively thick sheet having higher tolerance is fed from either of the automatic feeding unit and the manual feeding unit, it is likely that the sheet gets damaged by being forced to bend at the bend section. As a result, it becomes difficult to feed different types of sheets for reading images therefrom.

SUMMARY OF THE INVENTION

It is an object of the present invention to at least partially solve the problems in the conventional technology.

According to an aspect of the present invention, there is provided an image reading apparatus including a feeding unit arranged at a first side of the image reading apparatus; a primary stacking unit arranged at a second side of the image reading apparatus; a conveying unit that conveys a medium over a conveying path including a bend section, the conveying unit conveying the medium in a first conveying direction from the feeding unit to the primary stacking unit in first conveying mode and conveying the medium in a second conveying direction opposite to the first conveying direction in second conveying mode; a reading unit that is arranged along the conveying path between the bend section and the primary stacking unit, and reads an image from the medium; a driving unit that drives the conveying unit into either one of the first conveying mode and the second conveying mode; a secondary stacking unit that receives the medium fed one by one from the primary stacking unit in the second conveying mode; and a switching unit that switches the conveying path between a first conveying path for conveying the medium in the first conveying direction through the bend section and a second conveying path for conveying the medium in the second conveying direction from the primary stacking unit to the secondary stacking unit by bypassing the bend section.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

While an image reading apparatus of the embodiments is explained, e.g., as an auto-document-feeder type image scanner (hereinafter, "ADF scanner") capable of automatically and successively feeding and scanning a large number of sheets, it can be a copier, a multifunction product (MFP), a facsimile machine, or a character recognizing device.

Figure 1:
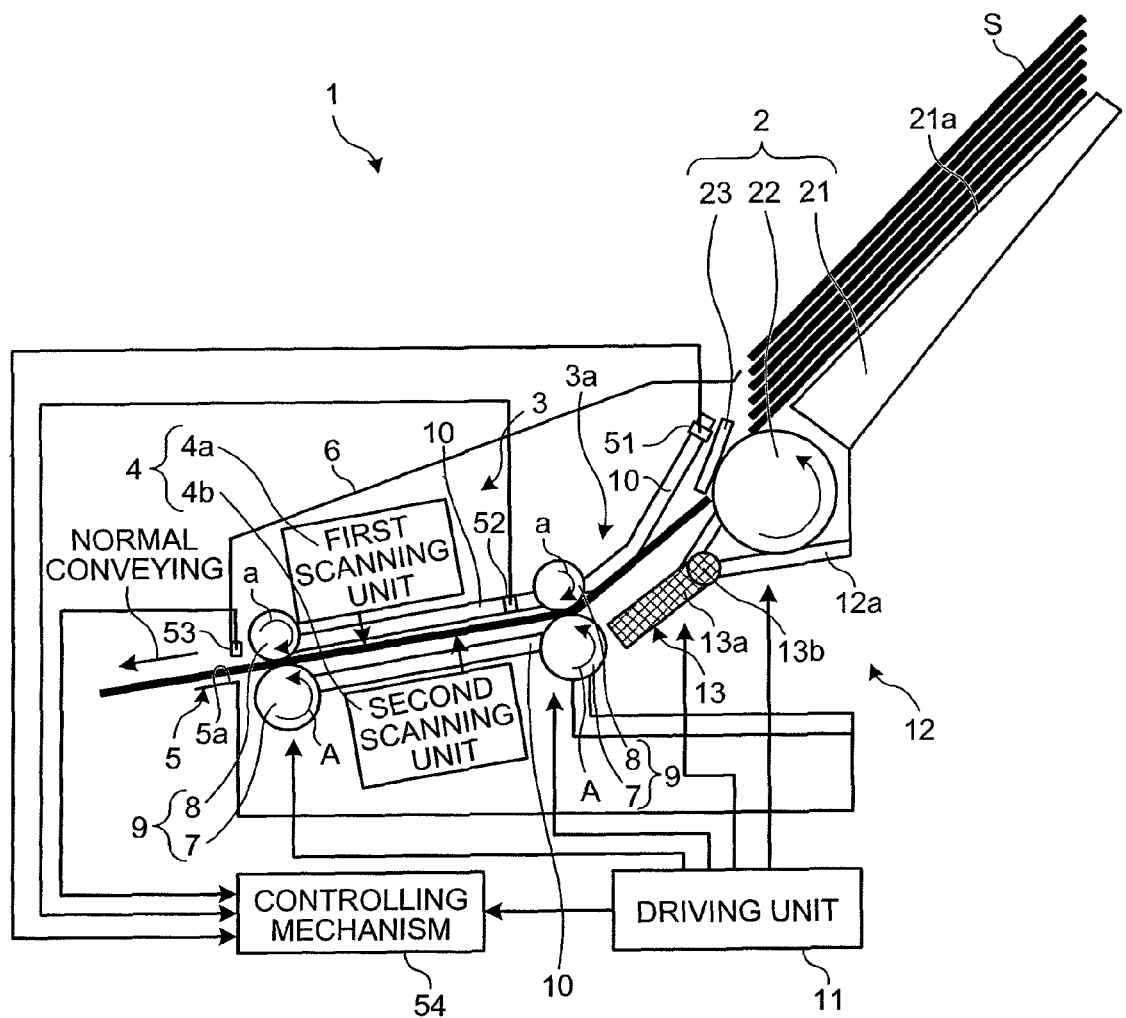
FIG. 1 is a schematic diagram of an image reading apparatus according to an embodiment of the present invention in normal conveying mode.
Figure 2:
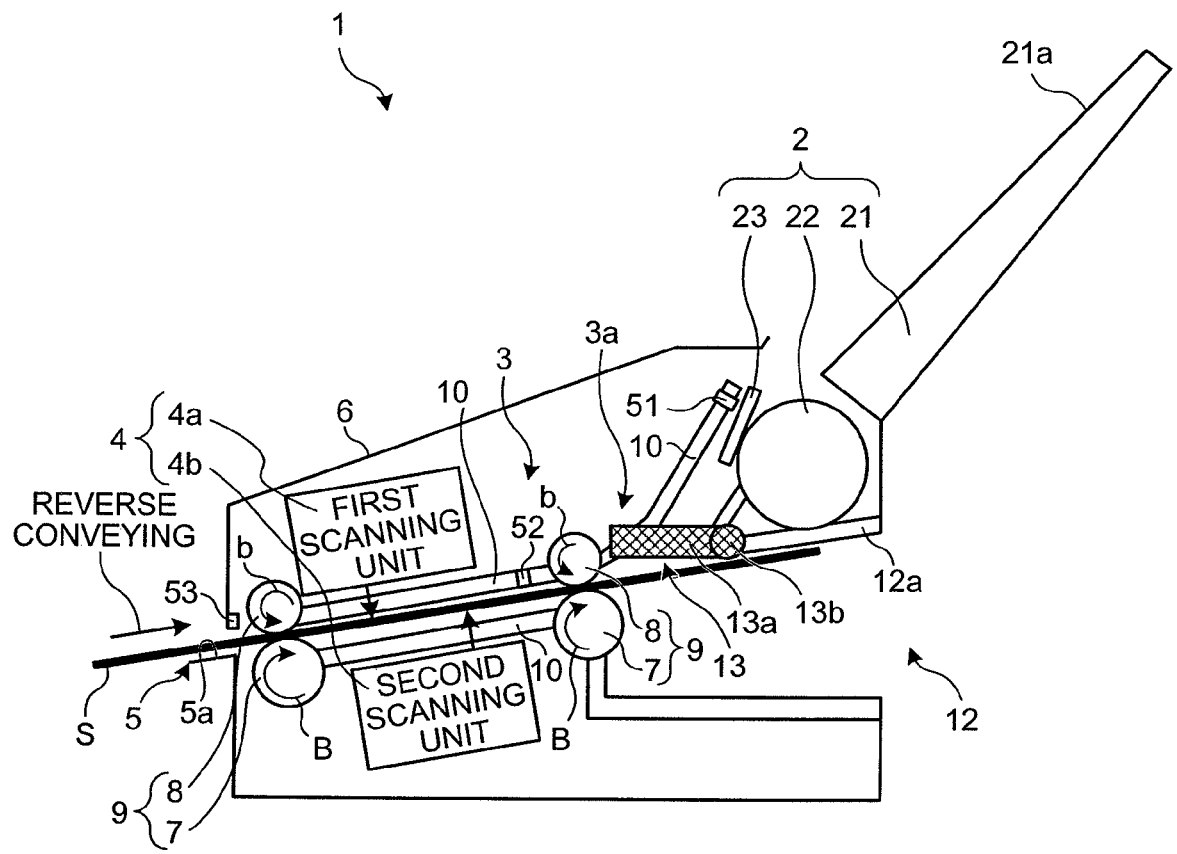
FIG. 2 is a schematic diagram of the image reading apparatus in reverse conveying mode.

FIG. 1 is a schematic diagram of an ADF scanner 1 as an image reading apparatus according to an embodiment of the present invention in normal conveying mode. FIG. 2 is a schematic diagram of the ADF scanner 1 in reverse conveying direction. The ADF scanner 1 includes an automatic document feeder (ADF) unit that automatically feeds originals (documents) S stacked thereon, a conveying unit 3 that conveys the fed documents S, an optical scanning unit 4 that scans the conveyed documents S for images, a primary stacking unit 5 that receives the documents S discharged after scanning, and a casing 6 that houses the components of the ADF scanner 1. The term "document" as used herein refers to any sheet-type medium that contains an image including text, photographs, and charts.

The ADF unit 2 separates the documents S one by one and feeds the separated one to the conveying unit 3. The ADF unit 2 is arranged at one side of the conveying unit 3. The ADF unit 2 includes a shooter 21, a pick roller 22, and a separation pad 23.

The shooter 21 includes a substantially rectangular stacking surface 21a on which the documents S are stacked. The stacked documents S are kept pressed against the stacking surface 21a by an urging force of an urging unit (not shown).

The pick roller 22 is arranged close to the feeding end of the stacking surface 21a, i.e., the end of the stacking surface 21a from which the documents S are fed one by one to the conveying unit 3. At each time of feeding, the pick roller 22 picks the bottommost of the stacked documents S to feed it to the conveying unit 3. The pick roller 22 is cylindrical in shape and made of a material such as foamed rubber that has high frictional force. The pick roller 22 extends along the stacking surface 21a with its central axis substantially parallel to the width direction of the stacking surface 21a, i.e., perpendicular to the feeding direction of the documents S. In other words, the pick roller 22 is arranged at that side of the rectangular stacking surface 21a which faces the conveying unit 3, and the central axis of the pick roller 22 is substantially parallel to that side. Moreover, the central axis of the pick roller 22 is positioned on the side of the bottom surface of the shooter 21, i.e., on the side opposite to the stacking surface 21a. The pick roller 22 is arranged such that its outer circumference lies on the extended plane of the stacking surface 21a. When the pick roller 22 rotates around its central axis in a pick direction, i.e., in the direction to move the stacked documents S away from the shooter 21 on the extended plane of the stacking surface 21a (shown by an counterclockwise arrow inside the pick roller 22 in FIG. 1), then the stacked documents S get mounted on the pick roller 22 and fed one by one to the conveying unit 3.

The separation pad 23 is arranged to abut against the pick roller 22 on the side of the stacking surface 21a. When the pick roller 22 rotates, the bottommost of the documents S gets separated between the separation pad 23 and the pick roller 22, and is fed to the conveying unit 3.

In this way, the documents S are separately and successively fed to the conveying unit 3.

The conveying unit 3 conveys each fed document S to the optical scanning unit 4 and then to the primary stacking unit 5. The primary stacking unit 5 is arranged at the side opposite to which the ADF unit 2 is arranged at. The conveying unit 3 includes a plurality of pairs of rollers 9 and a guide 10 arranged along the conveying path. The pair of rollers 9 each include a rotatable driving roller 7 and a driven roller 8. The driven roller 8 is arranged to abut against the driving roller 7 and rotated by the driving roller 7. In the embodiment, the two pairs of rollers 9 are arranged along the conveying direction. The driving roller 7 and the driven roller 8 are cylindrical in shape with substantially the same length. The central axis of the driving roller 7 as well as the driven roller 8 is arranged to horizontally intersect the conveying direction of the document S, i.e., along the width direction of the document S. The driving roller 7 and the driven roller 8 are arranged to be rotatable around their respective central axis.

The driving roller 7 is connected to a driving unit 11 via a transmitting gear or a belt (not shown). The driving unit 11 includes a motor (not shown) for rotating the driving roller 7. The driven roller 8 is kept abutted against the driving roller 7 by an urging unit (not shown). When conveying a document S fed from the ADF unit 2 to the primary stacking unit 5 (normal conveying), the driving roller 7 rotates in a rotating direction for normal conveying indicated by an counterclockwise arrow "A" in FIG. 1, i.e., in the direction in which the outer circumference of the driving roller 7 abutting against the driven roller 8 moves away from the ADF unit 2 towards the primary stacking unit 5. As the driving roller 7 starts rotating, the driven roller 8 also rotates in the direction indicated by a clockwise arrow "a" in FIG. 1, i.e., in the direction in which the outer circumference of the driven roller 8 abutting against the driving roller 7 moves away from the ADF unit 2 towards the primary stacking unit 5. Because of the urging force exerted on the driven roller 8, each document S fed by the ADF unit 2 is nipped between the rotating driving roller 7 and the driven roller 8, and is conveyed towards the primary stacking unit 5. In this way, the two pairs of rollers 9 are used to convey each document S to the primary stacking unit 5. The guide 10 guides the pairs of rollers 9 for conveying the documents S along the conveying path.

The pick roller 22 is also connected to the driving unit 11 via a transmitting gear or a belt (not shown), and is rotated by the motor in the driving unit 11.

Moreover, the conveying unit 3 includes a bend section 3a in the conveying path that facilitates downsizing of the ADF scanner 1. That is, the conveying path has a bend at the bend section 3a. As a result, first, each document S fed from the ADF unit 2 is conveyed up to the bend section 3a. The conveying path bends at the bend section 3a such that the document S is then conveyed to the primary stacking unit 5. In other words, the conveying direction of each document S fed from the ADF unit 2 changes at the bend section 3a towards the primary stacking unit 5.

The optical scanning unit 4 is arranged in the conveying path for scanning each conveyed document S for images. More particularly, the optical scanning unit 4 is arranged along the conveying path between the bend section 3a and the primary stacking unit 5. The optical scanning unit 4 includes a first scanning unit 4a that scans one (e.g., front) surface of the document S and a second scanning unit 4b that scans the other (e.g., rear) surface of the document S. The first scanning unit 4a and the second scanning unit 4b have almost identical configurations. Hence, unless otherwise noted, the first scanning unit 4a and the second scanning unit 4b are not distinguished hereinafter, and are collectively referred to as the optical scanning unit 4 for simplification.

The optical scanning unit 4 optically scans each document S for images and obtains image data by converting the images into electronic signals. The optical scanning unit 4 includes a light source (not shown), an image sensor (not shown), and a lens (not shown) that functions as a part of an optical system. The light source irradiates each document S by using a light emitting device such as light emitting diodes (LEDs). The lens focuses the reflected light from each document S on a light receiving surface of the image sensor. Upon receiving the reflected light through the lens, the image sensor obtains the image data by converting the received light into electronic signals. The image sensor can be, e.g., a charge-coupled device (CCD) line sensor, which is a linear image sensor (one-dimensional image sensor) in which a plurality of photoelectric conversion elements are linearly arranged perpendicular to the conveying direction of the document S. Upon receiving light, the photoelectric conversion elements generate charge. The array direction of the photoelectric conversion elements, i.e., the longitudinal direction of the image sensor is the main scanning direction. Thus, the direction perpendicular to the main scanning direction, i.e., the conveying direction of the document S becomes the sub-scanning direction.

Thus, upon being irradiated by the light from the light source, each document S reflects the light that passes through the lens, falls onto the image sensor, and is converted into electronic signals such that images on each document S are obtained for each read-line in the main scanning direction. As the document S keeps moving with respect to the image sensor in the sub-scanning direction, the optical scanning unit 4 repetitively scans the document S in the main scanning direction and along the sub-scanning direction to obtain two-dimensional image data.

The primary stacking unit 5 includes a discharge opening 5a arranged in the casing 6. Each document S scanned by the optical scanning unit 4 is discharged out of the casing 6 to the primary stacking unit 5 from the discharge opening 5a. The primary stacking unit 5 can include a stacking tray for stacking thereon the discharged documents S.

To sum up, in the ADF scanner 1, the pick roller 22 and the separation pad 23 separate one document S from the documents S stacked on the stacking surface 21a, and feed the separated document S to the conveying unit 3. Each fed document S is conveyed to the optical scanning unit 4 via the bend section 3a, and then discharged to the primary stacking unit 5. The conveying direction changes towards the primary stacking unit 5 at the bend section 3a. The optical scanning unit 4 scans each document S to obtain two-dimensional image data.

However, if comparatively thin and easily bendable sheets such as overhead projector (OHP) films or tracing paper sheets are stacked on the shooter 21, the ADF unit 2 may not be able to separate one sheet from the stack and feed the separated sheet to the conveying unit 3. There is also a possibility that the sheets get damaged in such process. On the other hand, if comparatively thick sheets having higher tolerance, such as heavy paper sheets or cards, are stacked on the shooter 21, there is a possibility that the sheets get damaged by being forced to bend at the bend section 3a during conveyance. Thus, it may not be possible for the ADF scanner 1 to scan some types of sheets when fed with them from the ADF unit 2.

To solve such a problem, the driving unit 11 also functions as a path switching unit for switching the conveying directions depending on the type of sheets. Moreover, the ADF scanner 1 further includes a secondary stacking unit 12 used to stack thereon sheets discharged after scanning and a flapper unit 13 used at the time of switching the conveying directions. In the case of scanning atypical-type sheets, the sheets are fed not from the ADF unit 2 but from the primary stacking unit 5, and are discharged to the secondary stacking unit 12. That is, the primary stacking unit 5 functions as a feeding unit for atypical-type sheets. Such a feature enables the ADF scanner 1 to scan different types of sheets.

Thus, the sheets that the ADF scanner 1 is able to scan can be categorized into normal-type sheets and atypical-type sheets. The normal-type sheets include, e.g., commonly-used photocopying paper sheets having usual thickness and tolerance. In the case of the normal-type sheets, the ADF unit 2 can separate one sheet at a time from the stack of sheets and feed the separated sheet to the conveying unit 3. Moreover, the normal-type sheets do not get damaged by passing over the bend section 3a. Thus, it is possible to stack the normal-type sheets on the shooter 21 for automatic feeding. On the other hand, the atypical-type sheets can be thinner than the normal-type sheets or can have higher tolerance. The atypical-type sheets can be OHP films, tracing paper sheets, heavy paper sheets, or card-shaped sheets. Even if the atypical-type sheets are stacked in the ADF unit 2, it may not be possible for the ADF unit 2 to separate one sheet at a time and feed the separated sheet to the conveying unit 3. Moreover, it is also likely that the atypical-type sheets get damaged by being forced to bend at the bend section 3a. Thus, instead of stacking the atypical-type sheets in the ADF unit 2 for automatic feeding, the atypical-type sheets can be manually fed one by one from the primary stacking unit 5. However, unless otherwise noted in the following description, the normal-type sheets and the atypical-type sheets are not distinguished hereinafter, and are simply referred to as the documents S. Meanwhile, it is also possible to manually feed one normal-type sheet at a time from the primary stacking unit 5.

As described above, the driving unit 11 drives the conveying unit 3. In addition, the driving unit also switches the conveying direction of the documents S from the normal conveying direction (as shown in FIG. 1) to the reverse conveying direction (as shown in FIG. 2), and vice versa. That is, in normal conveying mode, the driving unit 11 drives the driving roller 7 in the rotating direction for normal conveying "A" such that each document S is conveyed from the ADF unit 2 to the primary stacking unit 5. On the other hand, in reverse conveying mode, the driving unit 11 drives the driving roller 7 in a rotating direction for reverse conveying indicated by a clockwise arrow "B" in FIG. 2 such that the driven roller 8 is also rotated in the counterclockwise direction indicted by "b" in FIG. 2. As a result, each document S is conveyed from the primary stacking unit 5 towards the bend section 3a. Thus, when in the normal conveying mode, each document S, which is fed from the ADF unit 2 and scanned by the optical scanning unit 4, is discharged to the primary stacking unit 5. On the other hand, when in the reverse conveying mode, the documents S can be manually fed one by one from the primary stacking unit 5.

When in the reverse conveying mode, after each document S is manually fed from the primary stacking unit 5 and scanned by the optical scanning unit 4, the document S is discharged to the secondary stacking unit 12. The flapper unit 13 is arranged at the bend section 3a and used at the time of switching between the normal conveying direction and the reverse conveying direction.

The secondary stacking unit 12 is arranged on the opposite side of the primary stacking unit 5 sandwiching therebetween the flapper unit 13. When in the reverse conveying mode, the flapper unit 13 covers the bend section 3a such that a straight conveying path is laid for conveying the documents S from the primary stacking unit 5 to the secondary stacking unit 12. That is, the conveying path from the primary stacking unit 5 up to the secondary stacking unit 12 does not include any bends. The secondary stacking unit 12 includes a discharge opening 12a arranged in the casing 6. Each document S fed from the primary stacking unit 5 is conveyed to the optical scanning unit 4 for scanning and discharged out of the casing 6 to the secondary stacking unit 12 from the discharge opening 12a. The secondary stacking unit 12 can include a stacking tray for stacking thereon the discharged documents S.

The flapper unit 13 can switch between a position for normal conveying (refer to FIG. 1) and a position for reverse conveying (refer to FIG. 2). When in the position for normal conveying, the flapper unit 13 guides the leading edge of each document S, which is fed from the ADF unit 2, over the bend section 3a towards the primary stacking unit 5. On the other hand, when in the position for reverse conveying, the flapper unit 13 guides the leading edge of each document S, which is fed from the primary stacking unit 5, directly to the secondary stacking unit 12 by bypassing the bend section 3a.

More particularly, as shown in FIGS. 3 to 6, the flapper unit 13 includes a plurality of guide members 13a, an oscillation axis 13b, and an arm 13c. The guide members 13a make contact with each fed document S and guide the document S to either the primary stacking unit 5 or the secondary stacking unit 12 depending on the conveying mode. The base of each guide member 13a is fixed to the oscillation axis 13b, while the front side of each guide member 13a protrudes towards the primary stacking unit 5 in an unguiform manner. An intermediate member 13d is arranged on the sides of each guide member 13a. The oscillation axis 13b supports the guide members 13a such that they can oscillate between the position for normal conveying and the position for the reverse conveying. The arm 13c protrudes from one end of the oscillation axis 13b and in the radial direction of the oscillation axis 13b. The arm 13c is arranged to abut against an eccentric cam 14a described later.

The axis line of the oscillation axis 13b horizontally intersects with the conveying direction of the documents S. That is, the axis line of the oscillation axis 13b is arranged along the width direction of the documents S. As described above, each guide member 13a is arranged such that its front side protrudes towards the primary stacking unit 5 (refer to FIGS. 1 and 2). When in the normal conveying mode, the flapper unit 13 oscillates around the oscillation axis 13b to switch itself in the position for normal conveying. In this case, the guide members 13a keep the conveying path from the ADF unit 2 up to the primary stacking unit 5 open for conveying the documents S and guide the leading edge of each document S along that conveying path (refer to FIGS. 1, 3, and 4). On the other hand, when in the reverse conveying mode, the flapper unit 13 oscillates around the oscillation axis 13b to switch itself in the position for reverse conveying. In that case, the guide members 13a cover the bend section 3a such that the conveying path towards the ADF unit 2 is blocked and guide the leading edge of each document S, which is fed from the primary stacking unit 5, to the secondary stacking unit 12 (refer to FIGS. 2, 5, and 6).

Each guide member 13a has a surface with a curvature 13e making contact with the documents S when in the normal conveying mode. That is, when in the normal conveying mode, the curvature 13e is a concave portion on a surface of each guide member 13a over which the documents S fed from the ADF unit 2 are conveyed. The curvature 13e is shown on the upper surface of each guide member 13a in FIGS. 3 to 6. When in the normal conveying mode, after each document S fed from the ADF unit 2 reaches the bend section 3a, the guide members 13a smoothly guide the leading edge of the document S towards the primary stacking unit 5 over the respective curvatures 13e. Thus, the conveying direction changes towards the primary stacking unit 5 without any difficulty thereby enhancing stability in the process of conveying the documents S. In other words, it is the curvatures 13e that form the bend section 3a in the conveying path for normal conveying. Thus, when in the normal conveying mode, the flapper unit 13 guides the documents S over the curvatures 13e, i.e., over the bend section 3a towards the primary stacking unit 5. On the other hand, when in the reverse conveying mode, the flapper unit 13 guides the documents S under the lower surface of each guide member 13a, i.e., under the surface that lies on the other side of the curvatures 13e, and directly to the secondary stacking unit 12 by bypassing the bend section 3a.

The ADF scanner 1 includes a transmitting unit 14 that transmits the driving force of the driving unit 11 to the flapper unit 13. The driving force of the driving unit 11 is used to switch the flapper unit 13 between the position for normal conveying and the position for reverse conveying. Such a feature enables to downsize the ADF scanner 1 into a compact structure. Moreover, the flapper unit 13 can switch between the position for normal conveying and the position for reverse conveying in conjunction with the normal conveying mode and the reverse conveying mode, respectively.

The transmitting unit 14 includes the eccentric cam 14a, a one-way clutch 14b with torque limiting function (hereinafter, "clutch 14b"), and a torsion spring 14c functioning as an urging member.

Figure 5:
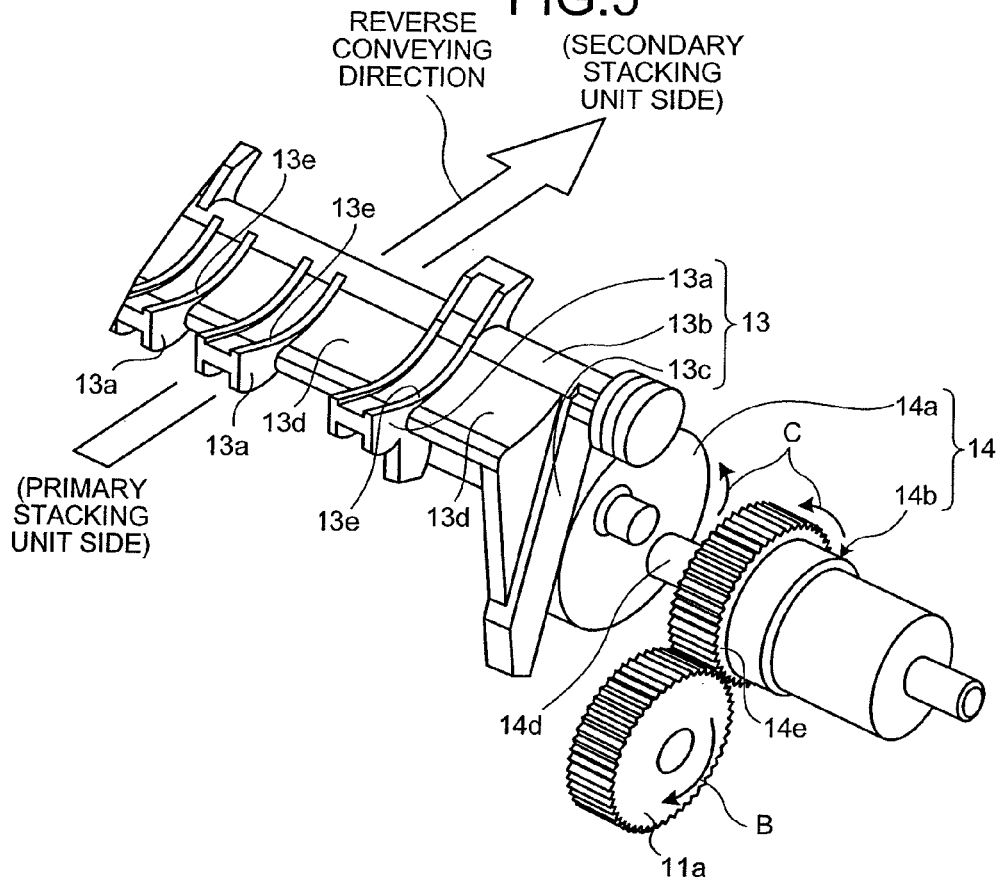
FIG. 5 is a perspective view of the flapper unit and the transmitting unit viewed from the side of the transmitting unit in the reverse conveying mode.
Figure 6:
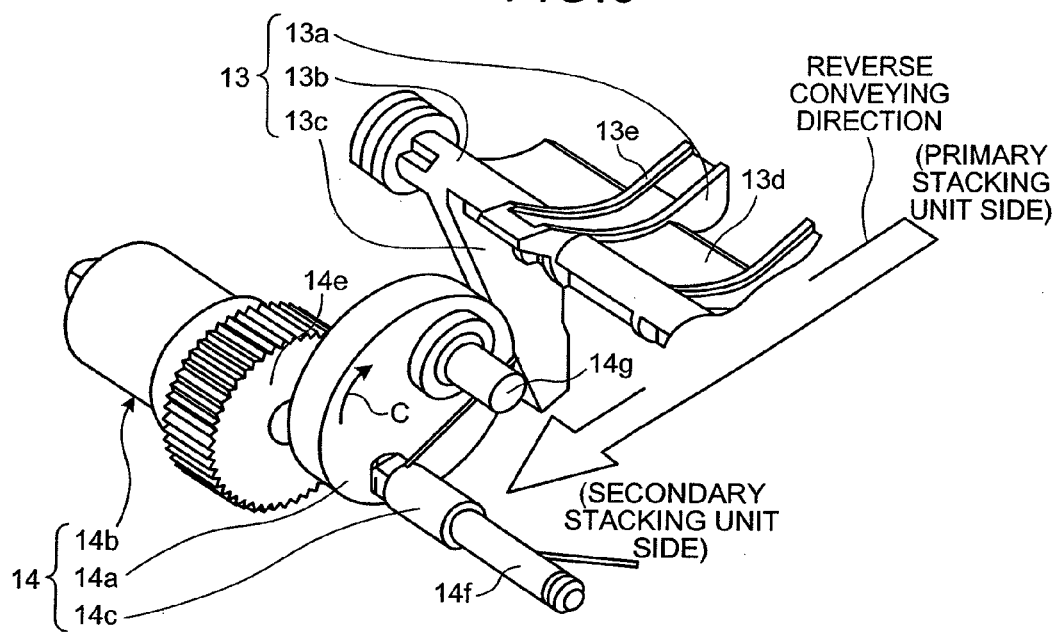
FIG. 6 is a perspective view of the flapper unit and the transmitting unit viewed from the side of the flapper unit in the reverse conveying mode.

The eccentric cam 14a is a substantially disc-shaped cam that is eccentrically connected to an output axis 14d of the clutch 14b. That is, the center of the eccentric cam 14a does not aligned with the output axis 14d. Moreover, when in the reverse conveying mode, the edge face of the eccentric cam 14a is arranged to abut against the arm 13c. The clutch 14b receives torque from a transmitting gear 11a that is arranged at an output axis of the motor of the driving unit 11. The clutch 14b transmits to the eccentric cam 14a the torque in only one direction. That is, when in the reverse conveying mode as shown in FIGS. 5 and 6, the clutch 14b transmits to the eccentric cam 14a the torque that is generated by the motor of the driving unit 11 in only the rotating direction for reverse conveying "B". The torque from the clutch 14b is transmitted to the eccentric cam 14a via a transmitting gear 14e. Thus, the rotation direction of the torque transmitted to the eccentric cam 14a is opposite to the rotation direction of the torque received by the clutch 14b. That is, when transmitting the torque only in the rotating direction for reverse conveying "B", torque in the opposite direction (transmitting direction) indicated by an arrow "C" in FIGS. 5 and 6 is transmitted to the eccentric cam 14a in actuality. The eccentric cam 14a rotates around the output axis 14d by the torque transmitted from the clutch 14b. When in the reverse conveying mode, because the eccentric cam 14a abuts against the arm 13c, the rotation of the eccentric cam 14a makes the arm 13c to switch the guide members 13a from the position for normal conveying (refer to FIGS. 3 and 4) to the position for reverse conveying (refer to FIGS. 5 and 6). The clutch 14b has a torque limiting function that makes the clutch 14b slip when a predetermined load acts thereon.

The torsion spring 14c is arranged on a first protrusion 14f that protrudes from the rear side of the eccentric cam 14a and opposite to the output axis 14d. One end of the torsion spring 14c is connected to a second protrusion 14g that also protrudes from the rear side of the eccentric cam 14a. Thus, when the eccentric cam 14a makes the arm 13c to switch the guide members 13a from the position for normal conveying to the position for reverse conveying, the torsion spring 14c urges the eccentric cam 14a in the direction opposite to the transmitting direction "C".

Figure 3:
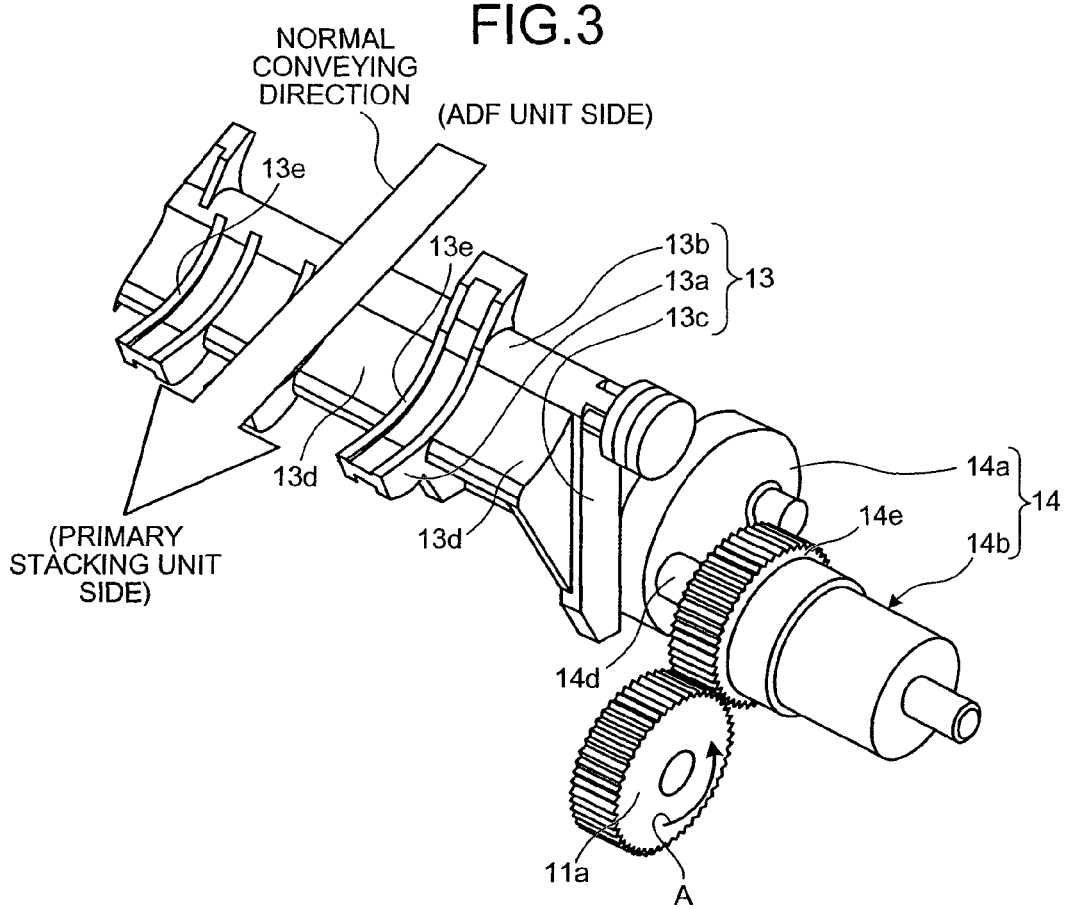
FIG. 3 is a perspective view of a flapper unit and a transmitting unit shown in FIG. 1 and viewed from the side of the transmitting unit in the normal conveying mode.
Figure 4:
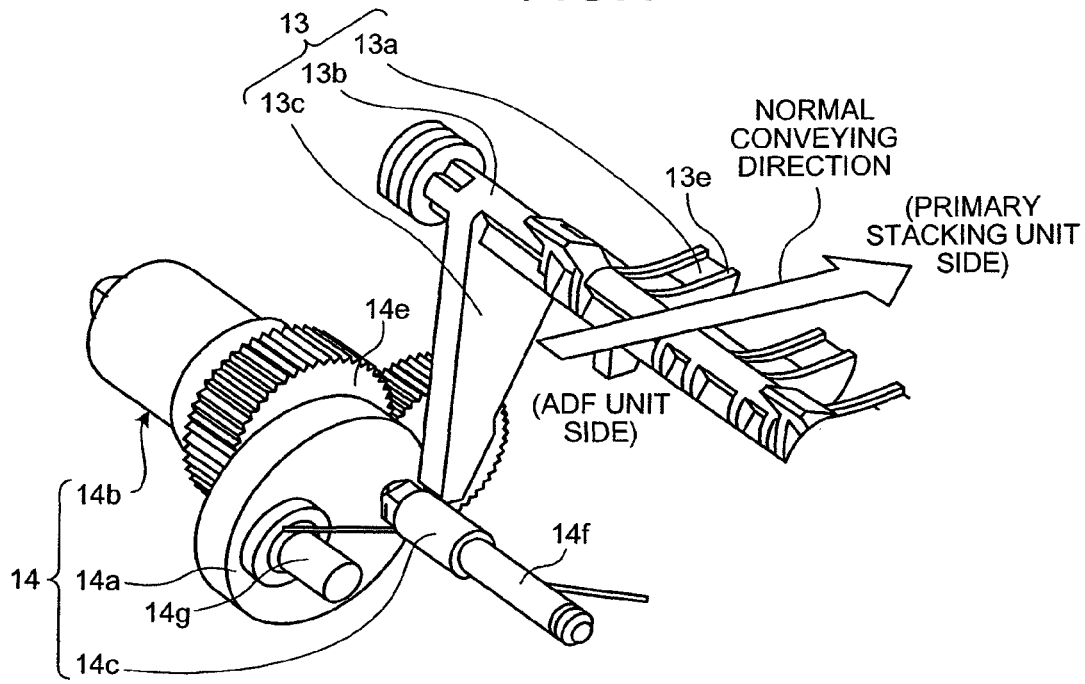
FIG. 4 is a perspective view of the flapper unit and the transmitting unit viewed from the side of the flapper unit in the normal conveying mode.

When in the normal conveying mode as shown in FIGS. 3 and 4, the clutch 14b does not transmit to the eccentric cam 14a the torque in the rotating direction for normal conveying "A". However, the torsion spring 14c still urges the eccentric cam 14a in the direction opposite to the transmitting direction "C". As a result, the eccentric cam 14a does not abut against the arm 13c. Thus, the guide members 13a remain in the position for normal conveying, i.e., in a downwardly protruded position due to their empty weight. When the conveying direction is switched for reverse conveying, the clutch 14b transmits the torque in the rotating direction for reverse conveying "B" and the eccentric cam 14a rotates in the transmitting direction "C". As a result, the eccentric cam 14a abuts against the arm 13c and pushes up the guiding members 13a to the position for reverse conveying. In this way, the flapper unit 13 gets switched from the position for normal conveying to the position for reverse conveying. When the eccentric cam 14a reaches a predetermined position, the torsion spring 14c urges the eccentric cam in the direction opposite to the transmitting direction "C" by a predetermined amount of urging force. At that predetermined amount of urging force, the torque limiting function of the clutch 14b stops the transmission of torque such that the eccentric cam 14a and the flapper unit 13 are maintained in their respective positions until the conveying direction is re-switched for normal conveying. When the conveying direction is re-switched for normal conveying, the guide members 13a return to the downwardly protruded position due to their empty weight and remain in the position for normal conveying.

Meanwhile, the ADF scanner 1 also includes a first detecting sensor 51 for the ADF unit 2, a second detecting sensor 52 for the optical scanning unit 4, a third detecting sensor 53 for the primary stacking unit 5, and a controlling mechanism 54. The first detecting sensor 51 is arranged near the separation pad 23 and is used to detect whether the documents S are stacked on the stacking surface 21a. The second detecting sensor 52 is arranged near the optical scanning unit 4 between the bend section 3a and the second scanning unit 4b, and is used to detect whether a document S is present in the conveying path between the bend section 3a and the primary stacking unit 5. The third detecting sensor 53 is arranged near the discharge opening 5a and is used to detect whether a document S is discharged to the primary stacking unit 5. According to the embodiment, although photosensors with infrared light are used as the first detecting sensor 51, the second detecting sensor 52, and the third detecting sensor 53, other technology such as ultrasound technology can also be used to detect the documents S. The first detecting sensor 51, the second detecting sensor 52, and the third detecting sensor 53 are electrically connected to the controlling mechanism 54, and send the respective detection result to the controlling mechanism 54 in the form of signals. The controlling mechanism 54 includes a microcomputer and controls the driving unit 11 based on the detection result of the first detecting sensor 51, the second detecting sensor 52, and the third detecting sensor 53.

Figure 7:
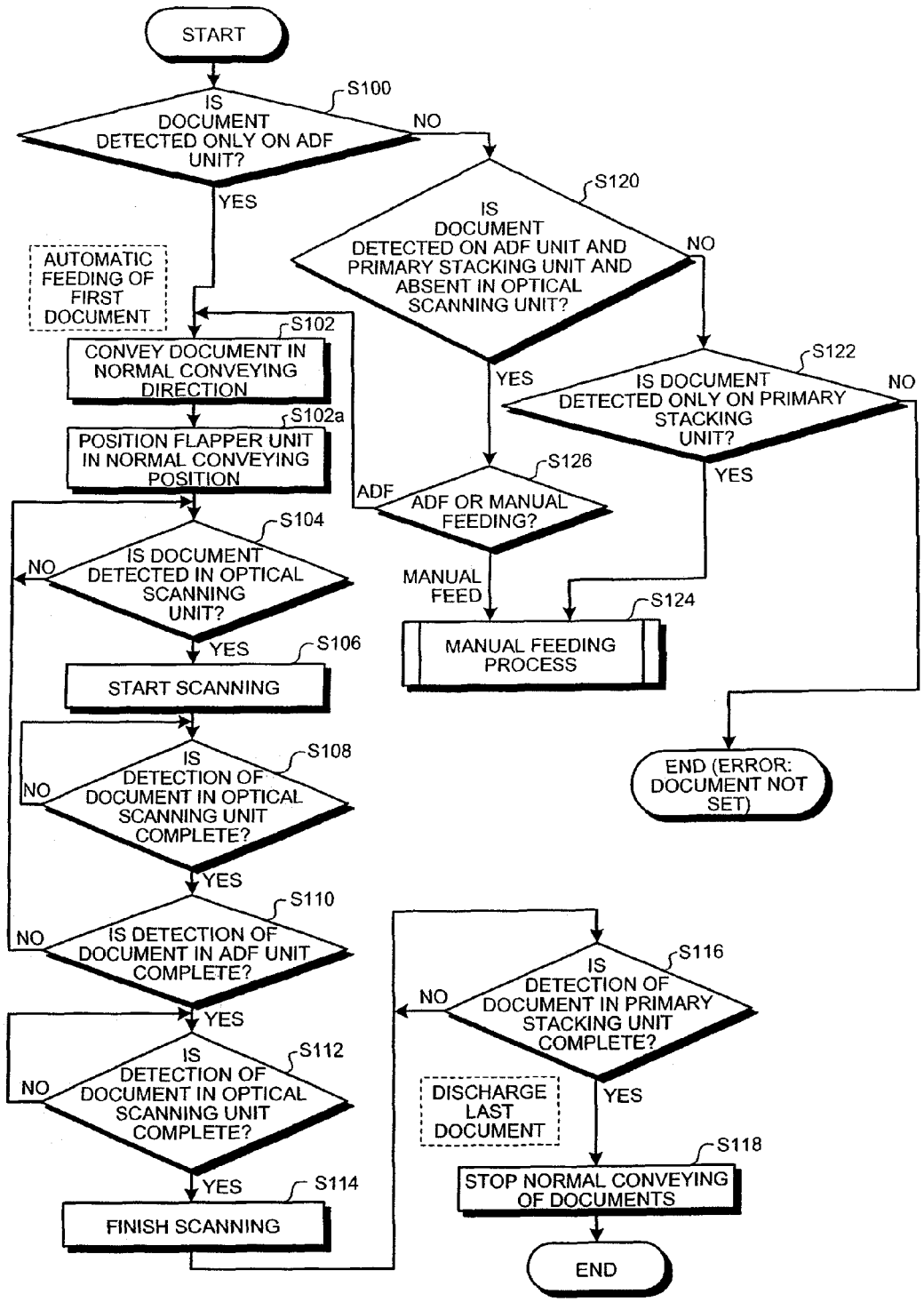
FIG. 7 is a flowchart of the operation of the image reading apparatus.

Given below is a flow of operations of the ADF scanner 1 with reference to FIG. 7. After turning ON the power of the ADF scanner 1 to perform scanning, the controlling mechanism 54 first determines whether only the first detecting sensor 51 is detecting documents (step S100). When the controlling mechanism 54 determines that only the first detecting sensor 51 is detecting documents, and the second detecting sensor 52 and the third detecting sensor 53 are not detecting any document (Yes at step S100), i.e., when documents are stacked on the ADF unit 2, then the first document is automatically fed from the stack to the conveying unit 3. The controlling mechanism 54 controls the driving unit 11 such that the conveying unit 3 conveys the first document in the normal conveying direction (step S102). Simultaneously, the flapper unit 13 is switched to the position for normal conveying (refer to FIGS. 1, 3, and 4) (step S102a).

The controlling mechanism 54 then determines whether the second detecting sensor 52 has detected the first document (step S104). When the controlling mechanism 54 determines that the second detecting sensor 52 has detected the first document (Yes at step S104), the optical scanning unit 4 starts scanning the first document (step S106). When the controlling mechanism 54 determines that the second detecting sensor 52 has not yet detected the first document (No at step S104), step S104 is repeated until the first document is detected.

The controlling mechanism 54 further determines whether the second detecting sensor 52 is no more detecting the first document (step S108). When the controlling mechanism 54 determines that the second detecting sensor 52 is still detecting the first document (No at step S108), i.e., when the first document is still passing over the optical scanning unit 4, step S108 is repeated until the second detecting sensor 52 completes detecting the first document.

When the controlling mechanism 54 determines that the second detecting sensor 52 has completed detecting the first document (Yes at step S108), i.e., when the first document has passed over the optical scanning unit 4, the controlling mechanism 54 then determines whether the first detecting sensor 51 is no more detecting the next document (step S110). When the controlling mechanism 54 determines that the first detecting sensor 51 has detected the next document (No at step S110), i.e., when one or more documents are still stacked on the ADF unit 2 for scanning, steps S104 to S110 are repeated for the remaining documents.

When the controlling mechanism 54 determines that the first detecting sensor 51 is no more detecting the next document (Yes at step S110), i.e., when the last document on the ADF unit is already conveyed for scanning, the controlling mechanism 54 then determines whether the second detecting sensor 52 is no more detecting the last document (step S112). When the controlling mechanism 54 determines that the second detecting sensor 52 is still detecting the last document (No at step S112), i.e., when the last document is still passing over the optical scanning unit 4, step S112 is repeated until the second detecting sensor 52 completes detecting the last document. When the controlling mechanism 54 determines that the second detecting sensor 52 has completed detecting the last document (Yes at step S112), i.e., when the last document has passed over the optical scanning unit 4, the optical scanning unit 4 finishes the process of scanning (step S114).

The controlling mechanism 54 then determines whether the third detecting sensor 53 is no more detecting the last document (step S116). When the controlling mechanism 54 determines that the third detecting sensor 53 is still detecting the last document (No at step S116), i.e., the last document is yet to be discharged to the primary stacking unit 5, step S116 is repeated until the third detecting sensor 53 completes detecting the last document. When the controlling mechanism 54 determines that the second detecting sensor 52 has completed detecting the last document (Yes at step S116), i.e., when the last document has been discharged to the primary stacking unit 5, the controlling mechanism 54 controls the driving unit 11 such that the conveying unit 3 stops the normal conveying mode (step S118). The controlling mechanism 54 then finishes the process of automatic feeding.

In this way, the ADF scanner 1 can automatically scan a large number of normal-type documents, which are stacked in the ADF unit 2, one by one. To sum up the abovementioned flow of operations, the controlling mechanism 54 controls the driving unit 11 such that the conveying unit 3 successively conveys documents as described at step S102. The flapper unit 13 is simultaneously switched to the position for normal conveying (refer to FIGS. 1, 3, and 4) as described at step S102a. That is, the conveying unit 3 conveys the documents automatically fed one by one from the ADF unit 2 to the primary stacking unit 5. In this case, the guide members 13a keep the conveying path from the ADF unit 2 to the primary stacking unit 5 open for conveying and guide the leading edge of each document over the bend section 3a (curvatures 13e). Thus, it is possible for the conveying unit 3 to stably convey the documents.

On the other hand, when determining that one of the second detecting sensor 52 and the third detecting sensor 53 is detecting a document (No at step S100), then the controlling mechanism 54 further determines whether both of the first detecting sensor 51 and the third detecting sensor 53 are detecting a document (step S120). When the controlling mechanism 54 determines that either one the first detecting sensor 51 and the third detecting sensor 53 is not detecting any document (No at step S120), then the controlling mechanism 54 further determines whether only the third detecting sensor 53 is detecting a document (step S122). When the controlling mechanism 54 determines that the third detecting sensor 53 is detecting a document (Yes at step S122), i.e., when a document is to be manually fed from the primary stacking unit 5, then the system control proceeds to step S124 for a manual feeding process. If the controlling mechanism 54 determines that the third detecting sensor 53 is not detecting any document (No at step S122), the controlling mechanism 54 reports a reason for non-detection (e.g., document not set) to the operator via a reporting unit (not shown).

When the controlling mechanism 54 determines that the first detecting sensor 51 and the third detecting sensor 53 are detecting a document, and the second detecting sensor 52 is not detecting any document (Yes at step S120), i.e., if, e.g., an operator tries to manually feed a document from the primary stacking unit 5 when another document is already stacked in the ADF unit 2, then the controlling mechanism 54 prompts the user to select either one of automatic feed mode and manual feed mode by using a selecting unit (not shown) (step S126). When the automatic feed mode is selected (ADF at step S126), the system control returns to step S102. On the other hand, when the manual feed mode is selected, (Manual feed at step S126), the system control returns to step S124 for the manual feeding process.

Figure 8:
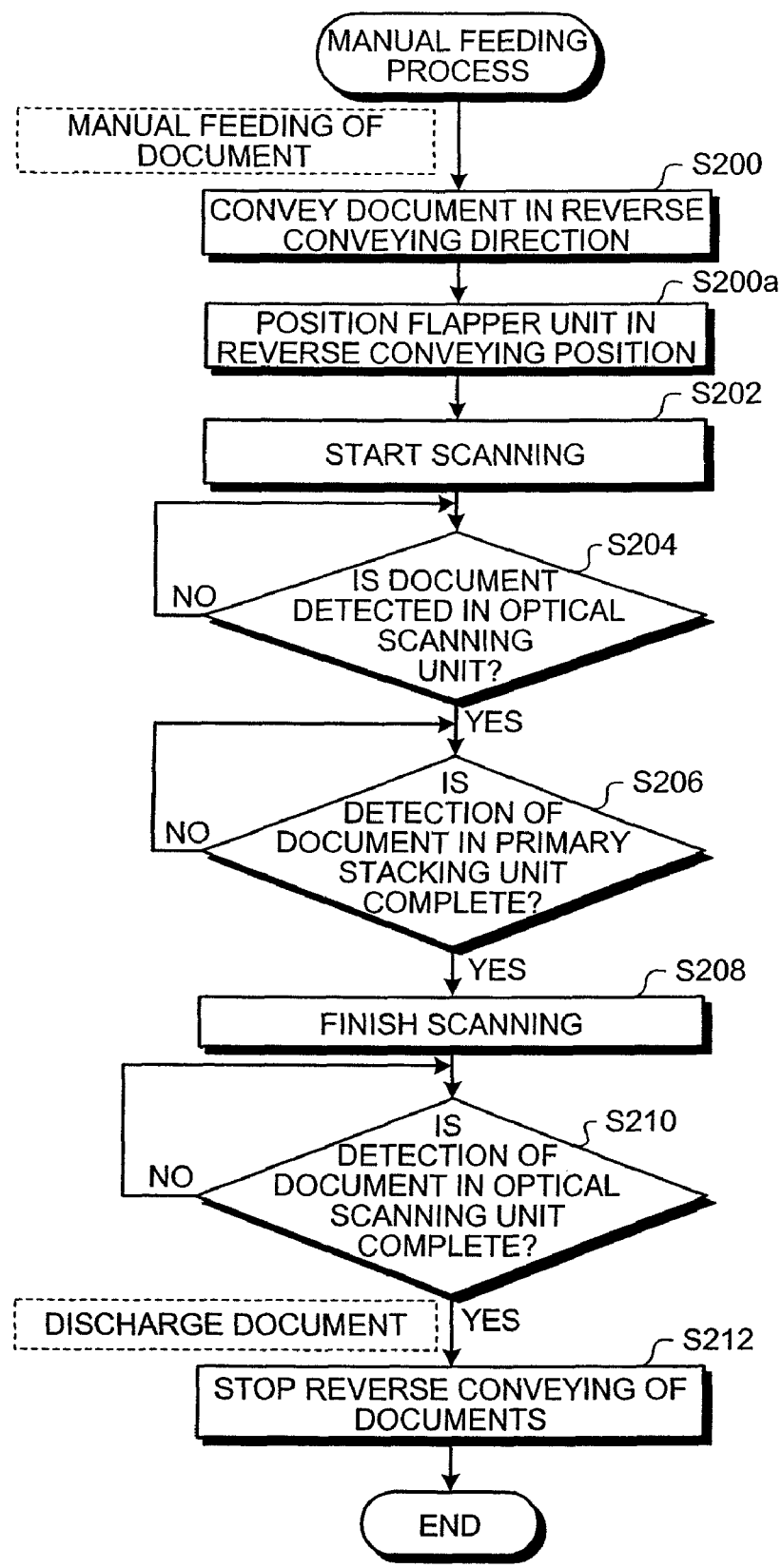
FIG. 8 is a detailed flowchart of a manual feeding process shown in FIG. 7.

Given below is a flow of the manual feeding process with reference to FIG. 8 in which a document is conveyed in the reverse conveying direction, i.e., when a document is manually fed from the primary stacking unit 5. When the controlling mechanism 54 determines that only the third detecting sensor 53 is detecting a document (Yes at step S122) or when the manual feed mode is selected (Manual feed at step S126), then the controlling mechanism 54 controls the driving unit 11 such that the conveying unit 3 conveys the document in the reverse conveying direction (step S200) Simultaneously, the flapper unit 13 is switched to the position for reverse conveying (refer to FIGS. 2, 5, and 6) (step S200a). Instantly, the optical scanning unit 4 starts scanning the document (step S202).

The controlling mechanism 54 then determines whether the second detecting sensor 52 is detecting the fed document (step S204). When the controlling mechanism 54 determines that the second detecting sensor 52 is not detecting the fed document (No at step S204), i.e., when the leading edge of the fed document is yet to reach the optical scanning unit 4, then step S204 is repeated until the fed document is detected. When the controlling mechanism 54 determines that the second detecting sensor 52 is detecting the fed document (Yes at step S204), i.e., when the leading edge of the fed document S has reached the optical scanning unit 4, then the controlling mechanism 54 determines whether the third detecting sensor 53 is no more detecting the fed document (step S206). When the controlling mechanism 54 determines that the third detecting sensor 53 is still detecting the fed document (No at step S206), i.e., when the trailing edge of the fed document S is yet to reach the optical scanning unit 4, then step S206 is repeated until the third detecting sensor 53 completes detecting the fed document. When the controlling mechanism 54 determines that the third detecting sensor 53 is no more detecting the fed document (Yes at step S206), i.e., when the trailing edge of the fed document has reached the optical scanning unit 4, the optical scanning unit 4 finishes scanning of the fed document (step S208).

The controlling mechanism 54 further determines whether the second detecting sensor 52 is no more detecting the scanned document (step S210). When the controlling mechanism 54 determines that the second detecting sensor 52 is still detecting the scanned document (No at step S210), i.e., when the scanned document is yet to be completely discharged to the secondary stacking unit 12, step S210 is repeated until the second detecting sensor 52 completes detecting the scanned document. When the controlling mechanism 54 determines that the second detecting sensor 52 is no more detecting the scanned document (Yes at step S210), i.e., when the scanned document is completely discharged to the secondary stacking unit 12, the controlling mechanism 54 controls the driving unit 11 such that the conveying unit 3 stops the reverse conveying mode (step S212). The controlling mechanism 54 then finishes the manual feeding process.

In this way, the ADF scanner 1 can scan atypical-type documents S (as well as normal-type documents S) manually fed from the primary stacking unit 5. To sum up the above-mentioned flow of operations, the controlling mechanism 54 controls the driving unit 11 such that the conveying unit 3 successively conveys the documents S in the rotating direction for reverse conveying "B" as described at step S200. The flapper unit 13 is simultaneously switched to the position for reverse conveying (refer to FIGS. 2, 5, and 6) as described at step S200a. As a result, the conveying unit 3 conveys the documents S manually fed one by one from the primary stacking unit 5 to the secondary stacking unit 12. In this case, the guide members 13a cover the bend section 3a such that the conveying path towards the ADF unit 2 is blocked. As a result, the documents S are prevented from being mistakenly conveyed to the ADF unit 2. Moreover, the guide members 13a guide the documents S to the secondary stacking unit 12 by bypassing the bend section 3a. Thus, it is possible for the conveying unit 3 to stably convey the atypical-type documents S without any damage. As described above, if the atypical-type documents S are stacked in the ADF unit 2, the ADF unit 2 may not be able to separate one document S at a time from the stack and feed the separated document S to the conveying unit 3. Moreover, it is also likely that an atypical-type document S gets damaged by being forced to bend at the bend section 3a. Thus, with the abovementioned option of manually feeding the atypical-type sheets from the primary stacking unit 5, the ADF scanner 1 is able to scan a wide range of atypical-type sheets despite a compact structure.

More particularly, in the case of scanning, e.g., an atypical-type sheet that has a comparatively higher tolerance and is difficult to bend, the conveying unit 3 conveys the sheet, which is manually fed from the primary stacking unit 5, in a straight conveying path up to the secondary stacking unit 12. Thus, the sheet is saved from getting damaged at the bend section 3a. Moreover, in the case of scanning, e.g., a comparatively thin and easily bendable sheet, because the flapper unit 13 blocks the conveying path towards the ADF unit 2, the sheet is prevented from being mistakenly conveyed to the ADF unit 2, i.e., over the bend section 3a. Thus, there is no possibility of the sheet getting bent or damaged at the bend section 3a, and hence no jams occur in the conveying path.

Meanwhile, the timing at which the optical scanning unit 4 finishes scanning all the documents S (steps S114 and S208) or the timing at which the conveying unit 3 stops conveying the documents S (steps S118 and S212) can be appropriately delayed depending on the arranged positions of the second detecting sensor 52 and the third detecting sensor 53.

To sum up, the conveying unit 3 conveys the documents S from the ADF unit 2, which is arranged on one side of the ADF scanner 1, to the primary stacking unit 5, which is arranged on another side of the ADF scanner 1. The optical scanning unit 4 arranged between the bend section 3a and the primary stacking unit 5 scans the documents S for images. The driving unit 11 drives the conveying unit 3 to perform either of the normal conveying and the reverse conveying. When in the reverse conveying mode, the secondary stacking unit 12 receives the documents S that are manually fed one by one from the primary stacking unit 5. The flapper unit 13 switches between the position for normal conveying and the position for reverse conveying. When in the position for normal conveying, the flapper unit 13 guides the leading edge of each document S, which is fed from the ADF unit 2, over the bend section 3a towards the primary stacking unit 5. On the other hand, when in the position for reverse conveying, the flapper unit 13 guides the leading edge of each document S, which is fed from the primary stacking unit 5, directly to the secondary stacking unit 12 by bypassing the bend section 3a.

Thus, depending on the type of the document S, it is possible to switch the conveying path for the normal conveying mode path and the reverse conveying mode. As a result, the ADF scanner 1 can scan different types of the documents S. Moreover, when in the reverse conveying mode, the primary stacking unit 5 functions as a secondary feeding unit that facilitates in downsizing of the ADF scanner 1 into a compact structure.

The documents S can be categorized into the normal-type documents S and the atypical-type documents S. A atypical-type document S can be thinner than a normal-type document S or can have higher tolerance. When in the normal conveying mode, the ADF unit 2 can separately feed each of the stacked normal-type documents S to the conveying unit 3. The conveying unit 3 discharges each fed document S to the primary stacking unit 5. On the other hand, if the atypical-type documents S are stacked in the ADF unit 2, it may not be possible for the ADF unit 2 to separate one document S at a time from the stack and feed the separated document S to the conveying unit 3. Moreover, it is also likely that the atypical-type documents S get damaged at the bend section 3a. To avoid such a problem, when in the reverse conveying mode, the atypical-type documents S can be manually fed one by one from the primary stacking unit 5 to the conveying unit 3. That is, on one hand, the ADF scanner 1 can automatically and sequentially scan a large number of the normal-type documents S, which are stacked in the ADF unit 2. On the other hand, with the option of manually feeding the documents S from the primary stacking unit 5, the ADF scanner 1 can also scan the atypical-type documents S, which otherwise may get damaged at the bend section 3a if subjected to the normal conveying mode.

The secondary stacking unit 12 is arranged on the opposite side of the primary stacking unit 5 sandwiching therebetween the flapper unit 13. Because the flapper unit 13 covers the bend section 3a when in the reverse conveying mode, a straight conveying path is laid for the documents S from the primary stacking unit 5 to the secondary stacking unit 12. Thus, an atypical-type document S, which, e.g., has a comparatively higher tolerance and is difficult to bend, can be conveyed smoothly without getting damaged at the bend section 3a.

When in the position for normal conveying, the flapper unit 13 keeps the conveying path from the ADF unit 2 up to the primary stacking unit 5 open for conveying the documents S. On the other hand, when in the position for reverse conveying, the flapper unit 13 blocks the conveying path towards the ADF unit 2 thereby preventing the documents S from being mistakenly conveyed to the ADF unit 2, i.e., over the bend section 3a. Thus, in the case of scanning, e.g., a comparatively thin and easily bendable document S, there is no possibility of the document S getting bent or damaged at the bend section 3a, and hence no jams occur in the conveying path.

When in the normal conveying mode, after a document S fed from the ADF unit 2 reaches the bend section 3a, the curvature 13e on the upper surface of each guide member 13a makes contact with the fed document S and smoothly guides the document S towards the primary stacking unit 5. Thus, the conveying direction changes towards the primary stacking unit 5 without any difficulty thereby enhancing stability in the process of conveying the documents S.

The transmitting unit 14 transmits the driving force of the driving unit 11 to the flapper unit 13 such that the flapper unit 13 can switch between the position for normal conveying and the position for reverse conveying. Such a feature enables to downsize the ADF scanner 1. Moreover, the flapper unit 13 can switch between the position for normal conveying and the position for reverse conveying in conjunction with the normal conveying mode and the reverse conveying mode, respectively.

The guide members 13a make contact with each fed document S and guide the document S to either of the primary stacking unit 5 and the secondary stacking unit 12 depending on the conveying mode. The oscillation axis 13b supports the guide members 13a such that they can oscillate between the position for normal conveying and the position for the reverse conveying. The arm 13c protruding from one end of the oscillation axis 13b abuts against the rotatable eccentric cam 14a. When in the reverse conveying mode, the eccentric cam 14a pushes up the guide members 13a from the position for normal conveying to the position for reverse conveying. The clutch 14b transmits to the eccentric cam 14a the torque generated by the driving unit 11 during only the reverse conveying mode. Moreover, the clutch 14b has a torque limiting function that makes the clutch 14b slip when a predetermined load acts thereon. The torsion spring 14c urges the eccentric cam 14a in the direction opposite to the rotating direction of the eccentric cam 14a. When in the normal conveying mode, the clutch 14b does not transmit the torque to the eccentric cam 14a. However, the torsion spring 14c still urges the eccentric cam 14a in the direction opposite to the rotating direction of the eccentric cam 14a. As a result, the guide members 13a remain in a downwardly protruded position due to their empty weight. When the conveying direction is switched for reverse conveying, the clutch 14b transmits the torque such that the eccentric cam 14a pushes up the guide members 13a to the position for reverse conveying. In this way, the flapper unit 13 is switched from the position for normal conveying to the position for reverse conveying. When the eccentric cam 14a reaches a predetermined position, the urging force of the torsion spring 14c reaches a predetermined amount. At that predetermined amount, the torque limiting function of the clutch 14b stops the transmission of the torque. The eccentric cam 14a and the flapper unit 13 are thus maintained in their respective positions until the conveying direction is re-switched for normal conveying.

The first detecting sensor 51 detects whether the documents S are stacked in the ADF unit 2. The second detecting sensor 52 detects whether a document S is present between the bend section 3a and the primary stacking unit 5 in the conveying path. The third detecting sensor 53 detects whether a document S is discharged to the primary stacking unit 5. The controlling mechanism 54 controls the driving unit 11 based on the detection result of the first detecting sensor 51, the second detecting sensor 52, and the third detecting sensor 53. Thus, depending on the unit used to feed the document S or the current position of the document S, it is possible to correctly switch the conveying direction as well as the position of the flapper unit 13.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth. More particularly, in the above description, although the ADF unit 2 is assumed to function as a primary feeding unit for automatically separating and feeding one sheet at a time from stacked sheets, a manual document-feeding unit can also be used as the primary feeding unit from which sheets are manually fed one by one. Moreover, although the driving unit 11 is used to combinedly drive the conveying unit 3 and the flapper unit 13, two driving units can also be arranged to separately drive the conveying unit 3 and the flapper unit 13. Furthermore, although the transmitting unit 14 is assumed to include the eccentric cam 14a, the clutch 14b, and the torsion spring 14c, a different configuration can also be implemented.

To sum up, according to an aspect of the present invention, it is possible to switch conveying paths and stacking units depending on the type of media that are to be read in the image reading apparatus. As a result, the image reading apparatus can scan different types of media. Specifically, the image reading apparatus, while reduced in size, can scan even such types of media that may get damaged if automatically fed and conveyed in a known manner as well as automatically scanning a large number of media.

Moreover, the conveying direction can be switched without any difficulty, which enhances stability in the process of conveying media.

Furthermore, a normal conveying path and a reverse conveying path can be switched based on a detection result regarding a medium on the conveying path from a sensor. Thus, it is possible to correctly switch the conveying direction.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus comprising:
a feeding unit arranged at a first side of the image reading apparatus;
a primary stacking unit arranged at a second side of the image reading apparatus;
a conveying unit that conveys a medium over a conveying path including a bend section, the conveying unit conveying the medium in a first conveying direction from the feeding unit to the primary stacking unit in a first conveying mode and conveying the medium in a second conveying direction opposite to the first conveying direction in a second conveying mode;
a reading unit that is arranged along the conveying path between the bend section and the primary stacking unit, and reads an image from the medium;
a driving unit that drives the conveying unit into either one of the first conveying mode and the second conveying mode;
a secondary stacking unit that receives the medium fed one by one from the primary stacking unit in the second conveying mode;
a switching unit that switches the conveying path between a first conveying path for conveying the medium in the first conveying direction through the bend section and a second conveying path for conveying the medium in the second conveying direction from the primary stacking unit to the secondary stacking unit by bypassing the bend section, the switching unit including:
a guide member that makes contact with the medium and guides the medium;
a shaft that supports the guide member such that the guide member is swingable between a first position for the first conveying mode and a second position for the second conveying mode; and
an arm that is arranged on one end of the shaft; and
a transmitting unit that transmits a driving force of the driving unit to the switching unit, the transmitting unit including:
an eccentric cam that is arranged to abut against the arm, and rotates in a first direction to move the guide member from the first position to the second position;
a clutch that transmits to the eccentric cam, torque generated by the driving unit in the second conveying mode and stops transmitting the torque when a predetermined load acts on the clutch; and
an urging unit that urges the eccentric cam in second a direction opposite to the first direction, wherein
the switching unit switches the conveying path between the first conveying path and the second conveying path by the driving force.

2. The image reading apparatus according to claim 1, wherein
the medium includes a first medium and a second medium, the second medium being thinner than the first medium or having higher tolerance than the first medium,
the feeding unit separately feeds the first medium from a stack of first media to the conveying unit in the first conveying mode, and
the primary stacking unit receives, in the first conveying mode, the first medium fed from the feeding unit, and separately feeds, in the second conveying mode, at least the second medium to the conveying unit.

3. The image reading apparatus according to claim 1, wherein the secondary stacking unit is arranged on a side opposite to the second side such that the switching unit is located between the primary stacking unit and the secondary stacking unit.

4. The image reading apparatus according to claim 1, wherein the switching unit keeps the first conveying path open in the first conveying mode, and prevents conveyance of a medium to the feeding unit in the second conveying mode.

5. The image reading apparatus according to claim 1, wherein the switching unit has a surface with a curvature thereon that, while in contact with a leading edge of the medium, guides the leading edge to the primary stacking unit.

6. The image reading apparatus according to claim 1, further comprising:
a first detecting unit that detects a medium in the feeding unit;
a second detecting unit that detects a medium between the bend section and the primary stacking unit on the conveying path;

a third detecting unit that detects a medium in the primary stacking unit; and a controlling unit that receives a detection result from each of the first detecting unit, the second detecting unit, and the third detecting unit, and controls the driving unit based on the detection result.

* * * * *